Dec. 12, 1933.  C. E. HATHORN  1,939,051
SLIDING WINDSHIELD
Filed June 8, 1932   2 Sheets-Sheet 2
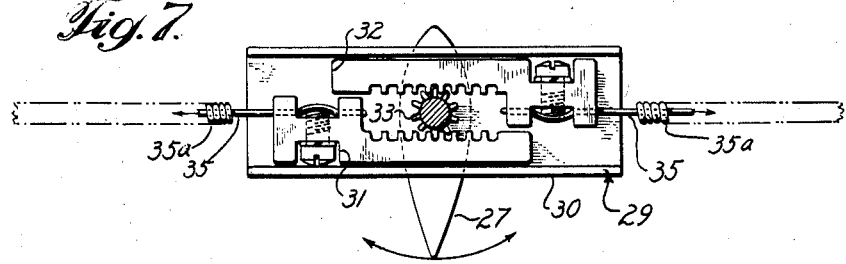
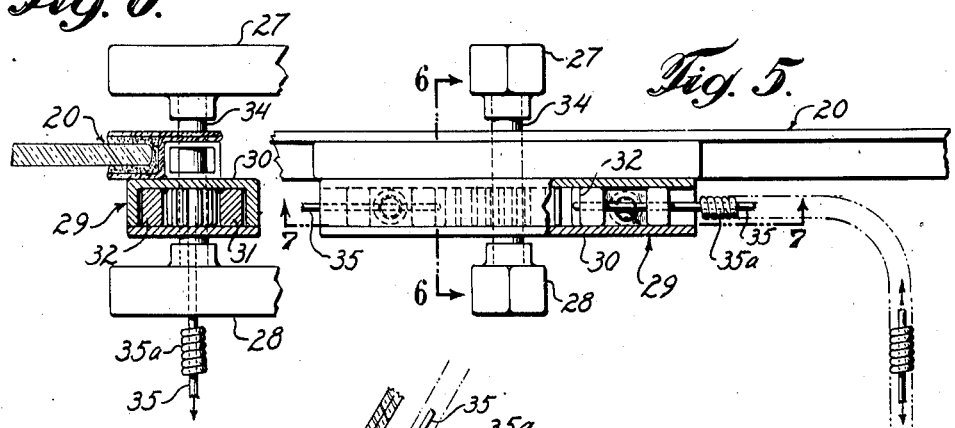
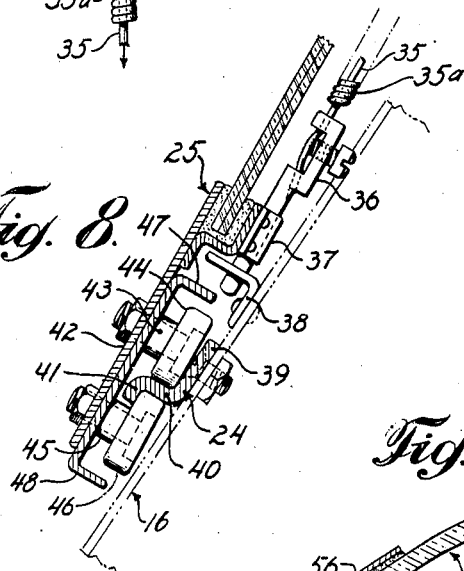
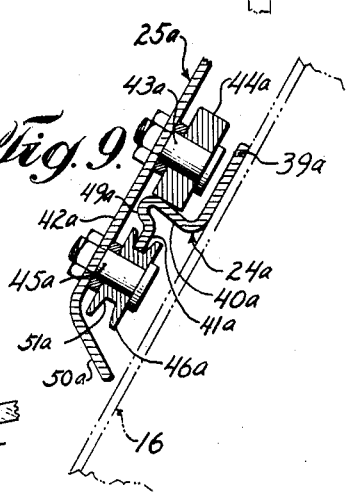
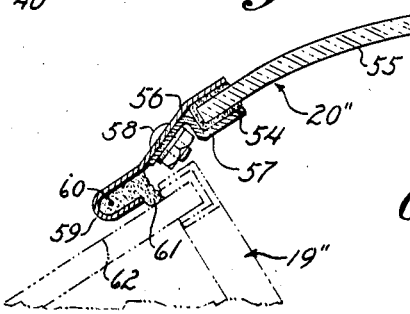
INVENTOR
Charles E. Hathorn
BY
ATTORNEY Patented Dec. 12, 1933

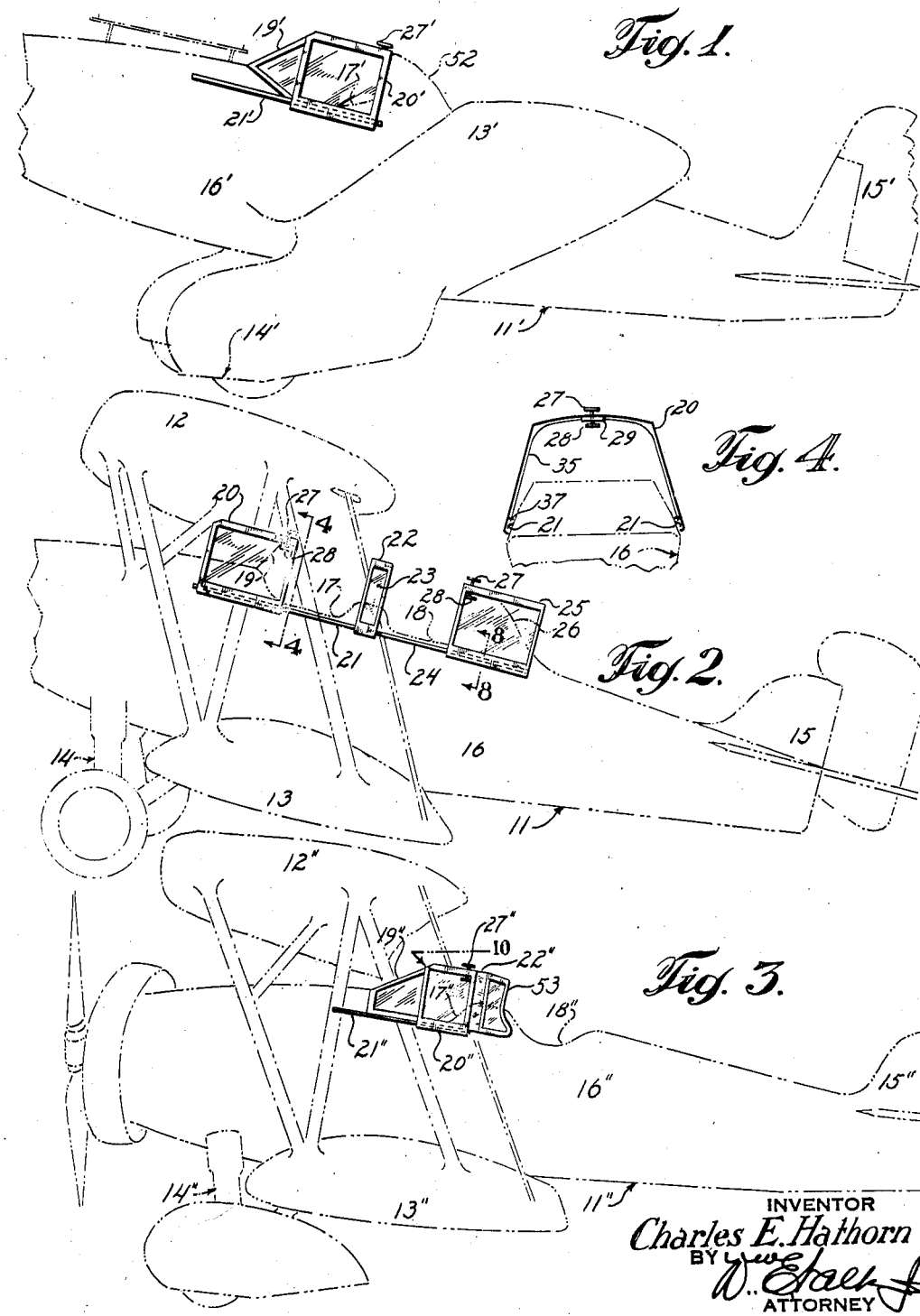

1,939,051

UNITED STATES PATENT OFFICE 1,939,051

SLIDING WINDSHIELD

Charles E. Hathorn, Hempstead, N. Y., assignor to Curtiss Aeroplane & Motor Company, Inc., a corporation of New York Application June 8, 1932. Serial No. 616,016

14 Claims. (Cl. 244—30)

This invention relates to airplanes, and more particularly to improvements in cabin attachments for airplanes of the open cockpit type.

Generally, airplanes may be considered as of the open cockpit type or of the cabin type. Both types usually comprise a body or fuselage with wings, landing gear and control surfaces attached to the fuselage. In the open cockpit type of airplane, openings are formed in the upper surface of the fuselage, and accommodations for crew and passengers are arranged within the fuselage in such a manner that the heads of crew and passengers project above the fuselage. The faces of the occupants are protected from the air blast by suitable windshields. The cabin type airplane is arranged so that the occupants are wholly accommodated within the fuselage, which is provided with suitable doors and windows.

Particularly in military aircraft, and in aircraft which are intended to carry one, two or three occupants, the open cockpit type of airplane has many advantages over the cabin type, such as superior speed, maneuverability and range of vision for the occupants. But on the other hand, the cabin type affords protection from weather, which is highly desirable.

An object of my invention is to provide a transparent cabin top for open cockpit airplanes, thereby retaining the advantages of the open cockpit type and gaining the advantages of the cabin type. Another object is to provide a cabin top that may be readily moved for entry and egress of an occupant to and from the cockpit. Another object is to provide simple means for locking the cabin closure in open or closed positions, and to provide means to prevent the entry of rain, sleet or snow within the enclosure formed by the cabin top, and to prevent such rain, sleet or snow from interfering with the operation of the cabin top. Another object of the invention is to provide a closure that, in cooperation with the airplane windshield, will afford a maximum degree of visibility for the occupants.

A further object of the invention is to provide a form of cabin top which may be adapted to one or more cockpits, and to provide an enclosure and windshield arrangement adaptable to military airplanes wherein one cockpit is closed and another is open for a gunner, photographer or other member of the crew.

In the past, cabin tops for open cockpit airplanes have been provided for airplanes, but these have usually had hinged doors or windows, or have required complete removal of the closure for entry and egress to and from the cockpit. With such construction it is not feasible to convert from an open to a closed position during flight. In previous embodiments of cabin closures, little thought has been given to the need of opening and closing the closure in the air, nor to the necessity of providing mechanism for this purpose that will be unaffected by weather conditions.

To more clearly disclose my invention, embodiments thereof are shown in the appended drawings, in which:

Fig. 1 is a side elevation of the invention applied to a single cockpit airplane;

Fig. 2 is a side elevation of the invention applied to both cockpits of a tandem cockpit airplane;

Fig. 3 is a side elevation of the invention applied to the front cockpit of a tandem cockpit airplane;

Fig. 4 is a section on the line 4—4 of Fig. 3;

Fig. 5 is an enlarged and detailed portion of Fig. 4, partly broken away;

Fig. 6 is a section on the line 6—6 of Fig. 5;

Fig. 7 is a section on the line 7—7 of Fig. 5;

Fig. 8 is an enlarged section on the line 8—8 of Fig. 7;

Fig. 9 is a section of an alternative embodiment of part of the structure of Fig. 8; and Fig. 10 is an enlarged sectional detail at line 10 of Fig. 3.

Three embodiments of the cabin top are shown in Figs. 1, 2 and 3, as applied to different airplanes, and for different uses. The detail construction is substantially identical in each embodiment. A detailed description of one, as that shown in Fig. 2, will describe equally the similar constructions of Figs. 1 and 3. Differences in arrangement of the embodiments of Figs. 1 and 3 will thereafter be described.

In the embodiment of Fig. 2, chosen for illustration, an airplane, designated in its entirety as 11, is equipped with the conventional wings 12 and 13, a landing gear 14, and tail control surfaces 15, all carried by a fuselage 16. Intermediately of the ends of the fuselage 16 are tandem cockpits 17 and 18, each suitable for an occupant of the airplane. Forwardly of the front cockpit 17 is a windshield 19, protecting the occupant of said cockpit from the air blast.

A cabin top 20 is adapted to slide longitudinally from the position shown, rearwardly to cover the cockpit 17. Rails 21 at each side of the cockpit guide and hold the cabin top 20.

Between the cockpits 17 and 18 a frame piece 22 is carried by the fuselage 16 to form a rear abutment against which the cabin top 20 is adapted to rest when it is moved to its closed or rearward position. The frame piece 22 is formed with a cross section similar to that of cabin top 20, and may be of opaque material or may have transparent windows 23 in its surface.

Extending rearwardly from the frame piece 22, along each side of the rear cockpit 18, are rails 24, similar to the forward rails 21. On the rails 24 a rear cabin top 25 is adapted to be carried, said cabin top 25 being substantially identical with the forward cabin top 20. Rearwardly of the rear cockpit 18, a rear end closure 26 is carried by the fuselage, and is formed at its forward end, where it meets the rear end of the cabin top 25 when the latter is in its closed position, as a continuation of the surface of the cabin top 25. Thence, the closure 26 merges rearwardly into the fuselage 16.

The windshield 19, cabin top 20, frame piece 22, cabin top 25 and closure 26, when the cabin tops are closed, form together a smooth unbroken cabin-like covering for the cockpits, presenting a minimum of resistance to the passage of the airplane through the air, and allowing perfect vision for the occupants.

A handle 27 is provided on the outside, and a handle 28 is provided on the inside of each cabin top 20 and 25 to enable the occupants to slide the cabin tops open or closed along their respective rails from within or from without. The handles 27 and 28 are carried by a lock operating mechanism 29 attached to the cabin top, which allows the occupant, by turning the handle, to lock the cabin top in an open, closed or intermediate position along the rails 24.

The lock operating mechanism 29 comprises a housing in which a pair of racks 31 and 32 are adapted to slide in opposite directions by rotation of an engaging pinion 33 formed on a shaft 34 joining the handles 27 and 28. Attached to the rack 31 is a wire 35, adapted to slide within a guide 35a, the wire 35 being attached at its opposite end to a lock 36 slidable in a bearing 37 attached toward the lower edge of the cabin top 25 at one side of the cockpit 18. A latch 38 is attached to the fuselage 16 adjacent the rails 24. By rotation of the handle 27 or 28, the pinion 33 causes translation of the rack 31, thereby sliding the lock 36 into or out of engagement with the latch 38 according to the direction of rotation of the handle 27 or 28.

A similar locking mechanism is attached to the rack 32 for the opposite side of the cockpit 18. A plurality of pairs of opposite latches identical with the latch 38 are spaced along both sides of the cockpit 18, and the handles 27 and 28 may be turned, as the cabin top 25 is slid along the rails 24, to selectively engage any pair of latches to retain the cabin top 25 in a desired position of opening.

The above description of the locking means per se, illustrated in Figs. 5, 6, 7 and 8, applies equally to the cabin top 20, which carries a duplicate of the mechanism carried by the cabin top 25.

Detailed mechanism involved in the support of the cabin top 25 by the rails 24 is illustrated in Fig. 8. The rail 24 is formed with a flat portion 39 attached to the fuselage 16, a track portion 40 extending substantially at a right angle to the flat portion 39, and a flange 41 turned downwardly at the outer edge of the track 40. The cabin top 25 carries a plate 42 at its lower edge, forming a mounting for an upper pivot 43 carrying the roller 44, and a lower pivot 45 carrying the roller 46. The pivots are so spaced that the roller 44 rolls on the upper surface of the track 40 of the rail 24, and the roller 46 rolls on the lower surface of the track 40. The flange 41 on the rail 24 serves to retain the roller 46 on the track 40, while the flat portion 39 serves to guide the roller 44 along the track 40.

Baffles 47 and 48, extending inwardly toward the fuselage 16, are carried by the plate 42 along the entire length of the cabin top 25, at points above and below the rollers 44 and 46, respectively. These baffles, in conjunction with the rail 24, serve to minimize the passage of rain and wind between the cabin top 25 and the fuselage 16.

Normally, four assemblies as shown in Fig. 8, comprising the rollers 44 and 46, are carried by each cabin top, as 25. One unit is attached to each lower corner of the cabin top, thereby supporting the cabin top firmly on the fuselage 16 and allowing it to roll easily along the rails 24 to cover or uncover the cockpit with which the cabin top is associated.

Fig. 9 shows an alternative embodiment of the rail and roller structure of Fig. 8. A rail 24a is attached to the fuselage 16 along a flat portion 39a thereof. The rail 24a has formed thereon a substantially right-angled portion 40a serving as a track for a cylinder roller 44a. At the outer edge of the rail 24a, the material is bent back upon itself forming a bead 49a, and is then bent downward and parallel to the flat portion 39a, forming thereby a flange 41a. The cabin top 25a has attached to its lower edge a plate 42a, normally lying parallel to the fuselage 16, and bent inwardly at its lower edge to form a baffle 50a. To the plate 42a is fastened a pivot 43a on which the roller 44a is adapted to rotate, the roller 44a engaging with the upper face of the track 40a. On the plate 42a is likewise mounted a pivot 45a having a roller 46a. The latter has an annular groove 51a adapted to engage the flange 41a of the said rail 24a, thereby holding the cabin top 25a from lateral movement with respect to the rail 24a and hence the fuselage 16. As in the embodiment of Fig. 8, rollers 44a and 46a are mounted as units at the forward and rearward corners on each side of the cabin top, and form a supporting and guiding means for the cabin top 25a as it is moved along the rails 24a. The baffle 50a, in conjunction with the rail 24a, forms an effective seal against wind and rain. In the roller embodiment of Fig. 9, lateral movement of the cabin top 25a is restrained solely by the grooved roller 46a as it engages the flange 41a of the rail 24a. In the other embodiment in Fig. 8 of the equivalent structure, lateral movement is restrained in one direction by engagement of the roller 44 with the flat portion 39, and in the other direction by engagement of the roller 46 with the flange 41.

I have described my invention in detail as applied to a tandem open cockpit airplane. I will now describe briefly the application of the invention to a single open cockpit airplane, believing that the detail description already given will apply equally to this embodiment.

The airplane 11' comprises a fuselage 16', with wings 13', landing gear 14' and tail surfaces 15' attached to the fuselage 16'. A single cockpit 17' is formed in the upper surface of the fuselage 16', and is provided with a windshield 19' forwardly thereof. Rails 21' are attached longitudinally of the fuselage 16' and on each side of the cockpit 17', extending from a point forward of the windshield 19' to a point opposite the rearward edge of the cockpit 17'. A cabin top 20' is slidable forwardly and rearwardly along the rails 21', in its rearward position being adapted to enclose the cockpit 17'. A rear end closure 52 is provided at the rearward end of the cockpit, being so formed that it blends the conformation of the cabin top 20' gradually into the fuselage 16', giving the assembly of windshield 19', cabin top 20' (in its closed position) and rear end closure 52, a favorable streamline form. Details of construction and operation of cabin top 20', rails 21' and handle 27' with its associated locking mechanism, are identical with those previously described.

I will now describe briefly the embodiment of my invention as applied to a tandem cockpit airplane 11", wherein the usual wings 12" and 13", the landing gear 14" and the tail surfaces 15" are attached in the conventional manner and arrangement to a fuselage 16".

The front cockpit 17", formed in the fuselage 16" has associated therewith a windshield 19", rails 21", a cabin top 20" and frame piece 22" identical with the arrangement first described. The frame piece 22", bridging the fuselage portion between the cockpits 17" and 18", may be solid, or may have windows similar to the windows 23 in Fig. 2.

Attached to the rear edge of the frame piece 22", is a windshield 53, serving to protect an occupant of the rear cockpit 18" from the direct blast of air caused by the passage of the airplane through the air. No cabin top is furnished for the rear cockpit 18", as the occupant's duties in this type of airplane make it necessary for him to be able to have range of activity in all possible directions with a gun, camera or the like.

Sealing of the cabin top 20" against the windshield 19", when the former is in position to cover the cockpit 17", is effectively accomplished by the structure shown in detail in Fig. 10. This detail structure is likewise included in connection with the windshield 19 and the cabin top 20 of Fig. 2, and with the windshield 19' and the cabin top 20' of Fig. 1.

The cabin top 20" is provided at its forward edge with a channel section 54 serving as a frame for the transparent top 55 thereof. A strip 56 is attached to the channel section 54, by means of another strip 57 and a bolt 58. The strip 56 is bent inwardly and back upon itself, forward of the bolt 58, to form a groove 59 in which a resilient felt strip 60 or the like is adapted to be held. The felt strip 60 is allowed to protrude from the groove 59, as at 61. As the cabin top 20" is moved rearwardly along its rails 21", the protruding felt 60 engages a slanting portion 62 of the windshield 19", forming by such engagement, a tight seal, preventing the entry of wind or rain between the windshield 19" and the cabin top 20".

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. The combination with an airplane of the open cockpit type, said airplane having fastened thereto in advance of the cockpit space a windshield; of a cabin attachment including rails fastened to the airplane one each at opposite sides of said cockpit, a cabin top carried by and movable along said rails to cover and uncover said cockpit, said cabin top having a shape in cross-section such that in its closed position it provides in effect a rearward prolongation of said windshield, and a rear end closure for the cabin top fastened to the airplane and with which the rear end of said cabin top in its closed position is adapted to engage.

2. The combination with an airplane of the open tandem cockpit type, said airplane having fastened thereto in advance of the cockpit space a windshield; of a cabin attachment including rails fastened to the airplane one each at opposite sides of the cockpit space, a fixed cabin frame-piece extending from one to the other of said rails and bridging the space between the tandem cockpits, a cabin top carried by and movable along said rails to cover and uncover the forward cockpit, said cabin top in its closed position providing a cockpit cover extending from said windshield to said frame-piece, and a windshield for the rear cockpit carried by said frame-piece.

3. The combination with an airplane of the open cockpit type, said airplane having fastened thereto in advance of the cockpit space a windshield; of a cabin attachment including rails fastened to the airplane one each at opposite sides of the cockpit space, a fixed cabin frame-piece extending from one to the other of said rails and bridging the space between the tandem cockpits, a rear end closure for the cabin attachment fastened to the airplane behind the cockpit space, a forward cabin top section carried by and movable along said rails to cover and uncover the forward cockpit, said forward cabin top section in its closed position providing a forward cockpit cover extending from said windshield to said frame-piece, and a rear cabin top section carried by and movable along said rails to cover and uncover the rear cockpit, said rear cabin top section in its closed position providing a rear cockpit cover extending from said frame-piece to said rear end closure.

4. A cabin attachment for airplanes of the open cockpit type including rails fastened to the airplane one each at opposite sides of the cockpit space, a cabin top carried by and movable along said rails to cover and uncover said cockpit, said cabin top having its opposite longitudinal edges extended beyond said rails, and rail engaging devices fastened to the cabin top on the inside face of each of its extended edges.

5. A cabin attachment for airplanes of the open cockpit type including rails fastened to the airplane one each at opposite sides of the cockpit space, each said rail having its outer edge turned downwardly, a cabin top carried by and movable along said rails to cover and uncover said cockpit, said cabin top having its opposite longitudinal edges extended beyond said rails, and rail engaging devices fastened to the cabin top on the inside face of each extended edge thereof, said devices being adapted to bear on the opposite faces of said rails.

6. A cabin attachment for airplanes of the open cockpit type including rails fastened to the airplane one each at opposite sides of the cockpit space, a cabin top carried by and movable along said rails to cover and uncover said cockpit, spaced devices for locking said cabin top against movement along said rails, and a unit means for operating said locking devices simultaneously.

7. A cabin attachment for airplanes of the open cockpit type including rails fastened to the airplane on each side of said cockpit, a cabin top carried by and movable along said rails to cover and uncover said cockpit, means for locking said cabin top against movement along said rails, and a device extending through said cabin top for operating said locking means.

8. A cabin attachment for airplanes of the open cockpit type including rails fastened to the airplane on each side of said cockpit, a cabin top carried by and movable along said rails to cover and uncover said cockpit, a plurality of locks carried by said cabin top, a plurality of latches on said airplane in which said locking devices are adapted to engage, and a unitary control device carried by said cabin top for operating said locks.

9. A cabin attachment for airplanes of the open cockpit, type including rails fastened to the airplane on each side of said cockpit, a cabin top carried by and movable along said rails to cover and uncover said cockpit, and rollers carried by said cabin top and engaging with said rails.

10. A cabin attachment for airplanes of the open cockpit type including rails fastened to the airplane on each side of said cockpit, a cabin top carried by and movable along said rails to cover and uncover said cockpit, a plurality of locks carried by said cabin top, and latches on said airplane in which said locks are adapted to engage.

11. A cabin attachment for airplanes of the open cockpit type including rails fastened to the airplane on each side of said cockpit, a cabin top carried by and movable along said rails to cover and uncover said cockpit, rollers carried by said cabin top and engaging with said rails, and inwardly extending projections carried by said cabin top longitudinally along its lower edges, forming a wind baffle in conjunction with said rails.

12. The combination with an airplane of the open cockpit type, of a windshield fastened to said airplane forward of said cockpit, rails fastened to said airplane on each side of said cockpit, a cabin top carried by and movable along said rails to cover and uncover said cockpit, the forward edge of said cabin top, in one position of adjustment, being adapted to lie adjacent the edge of said windshield, and a resilient sealing means between said cabin top edge and said windshield edge.

13. In a cabin attachment for an airplane having a cockpit, a pair of spaced rails attached one on each side of said cockpit, means carried by said attachment for engagement with said rails to permit the sliding of said attachment therealong, means for selectively locking said cabin attachment in a fixed position of adjustment along said rails, and means for preventing the entrance of weather elements into said cockpit when said cockpit is covered by said cabin attachment.

14. In an aircraft in combination, a cockpit, a cabin top adapted to selectively cover or uncover the whole of said cockpit, guiding means on each side of said cockpit, devices on said cabin top for engaging said guiding means, said cabin top being arranged for translation along said means in a direction substantially parallel to the line of flight of the aircraft, and means for selectively holding said cabin top in a plurality of positions of adjustment.

CHARLES E. HATHORN.